ADJUSTABLE BASE FOR HOLDING CHRISTMAS TREES AND THE LIKE
Filed April 20, 1946
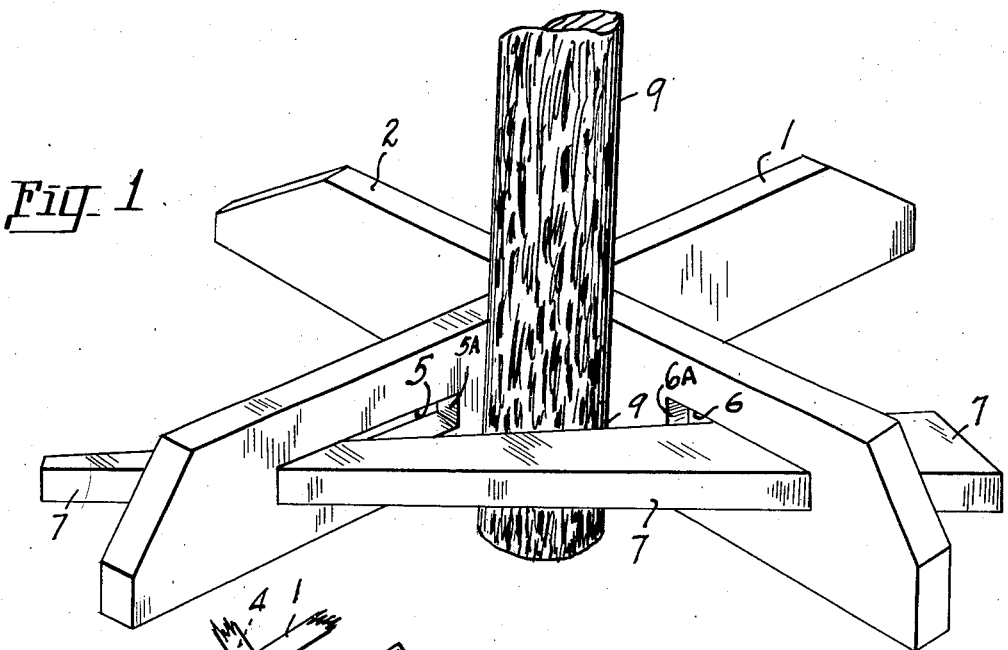
Fig. 1
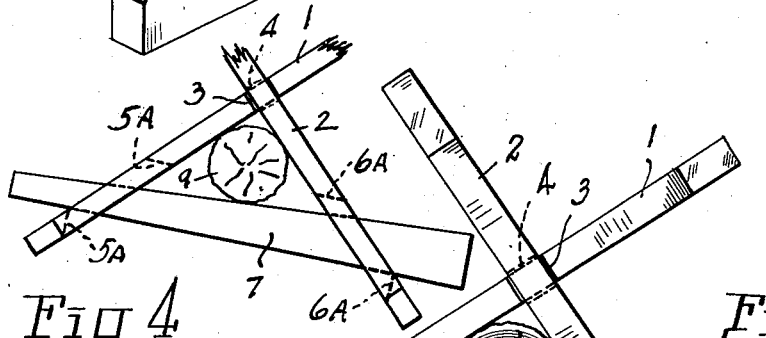
Fig. 4    Fig. 2
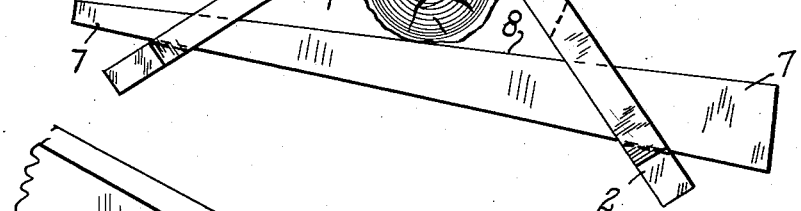
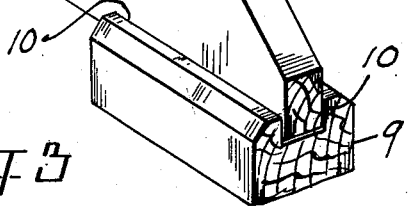
Fig. 3
HARRY O. DAVIS
*INVENTOR.*
BY James D. Girnan
ATTY Patented May 11, 1948

2,441,473

UNITED STATES PATENT OFFICE 2,441,473

ADJUSTABLE BASE FOR HOLDING CHRISTMAS TREES AND THE LIKE

Harry O. Davis, Portland, Oreg.

Application April 20, 1946, Serial No. 663,649

1 Claim. (Cl. 248—44)

This invention relates to improvements in detachable bases or stands for Christmas trees and the like.

It is one of the principal objects of the invention to provide a device of this character which is of simple, efficient and durable construction with a capacity for receiving and supporting trees of a wide range of sizes and which may also be disassembled or collapsed into compact form for shipping, storage, etc.

A further object of the invention is the provision of means associated therewith for elevating the device so that the lowermost end of the tree to which it is attached may be disposed in a reservoir of water for prolonging the freshness of the tree.

The foregoing and other objects will appear as my invention is more fully hereinafter described in the following specification illustrated in the accompanying drawings, and finally pointed out in the appended claim.

In the drawing:

Figure 1 is a perspective view of a device made in accordance with my invention and operatively attached to and supporting the trunk of a tree.

Figure 2 is a top plan view of Figure 1.

Figure 3 is a fragmentary view of an identical leg of the device associated with means for elevating the device with respect to a water receptacle (not shown).

Figure 4 is a slightly reduced fragmentary top plan view of the device with its parts re-arranged into a position to engage with and support trees having trunks of relatively smaller diameters.

Referring now more particularly to the drawing:

Reference numerals 1 and 2 indicate a pair of vertically disposed cross-arms slotted as at 3 and 4, respectively, for a mortised connection as shown. One outer end of each arm is horizontally slotted as at 5 and 6 to receive a wedge 7 whose inner edge or surface 8 is adapted to bear against the trunk 9 of a tree disposed between said edge and the intersection of said cross-arms 1 and 2.

It will be seen in Figures 1, 2 and 4, that the end walls 5A and 6A of the rectangular slots 5 and 6, respectively, are formed on angles of substantially 45 degrees with respect to the longitudinal axis of the cross-arms. With the cross-arms in the position shown in Figure 2, the outer end walls of the slots are parallel to the outer edge of the wedge to thereby allow the wedge to function at the outermost limit of its range for engaging with trees of large diameters.

When the cross-arms are reversed, or arranged in the position shown in Figure 4, the outer end walls 5A and 6A of the slots are disposed at substantially right angles to the outer edge of the wedge so that as the wedge is advanced through the slots its inner edge will be moved closer to the intersection of the cross-arms and accordingly enabled to grip and support a tree trunk of relatively smaller diameter.

As illustrated in Figure 3, I provide blocks 9 longitudinally slotted as at 10 to receive the ends of each cross-arm 1 and 2 for elevating the same with respect to a water receptacle (not shown) disposed directly below the bottom and of the trunk of the tree so that the same may absorb moisture from the reservoir to prolong the freshness of the tree.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

A tree stand consisting of two arms crossed and removably secured together to form two sides of a triangle, a slot formed near one end of each arm, a tapered wedge engageable with said arms through said slots to form the third side of the triangle and adapted when moved in one direction of its length to force a tree trunk against the inside walls of the arms for maintaining the tree in a vertical position.

HARRY O. DAVIS.

REFERENCES CITED

The following references are of record in the file of this patent:

UNITED STATES PATENTS

| Number | Name | Date |
|---|---|---|
| 982,866 | Poppendieck | Jan. 31, 1911 |
| 1,559,575 | McMillan | Nov. 3, 1925 |